June 10, 1941.  C. L. VOLZ  2,245,420
CUTTER HEAD FOR ELECTRIC RAZORS
Filed March 20, 1939
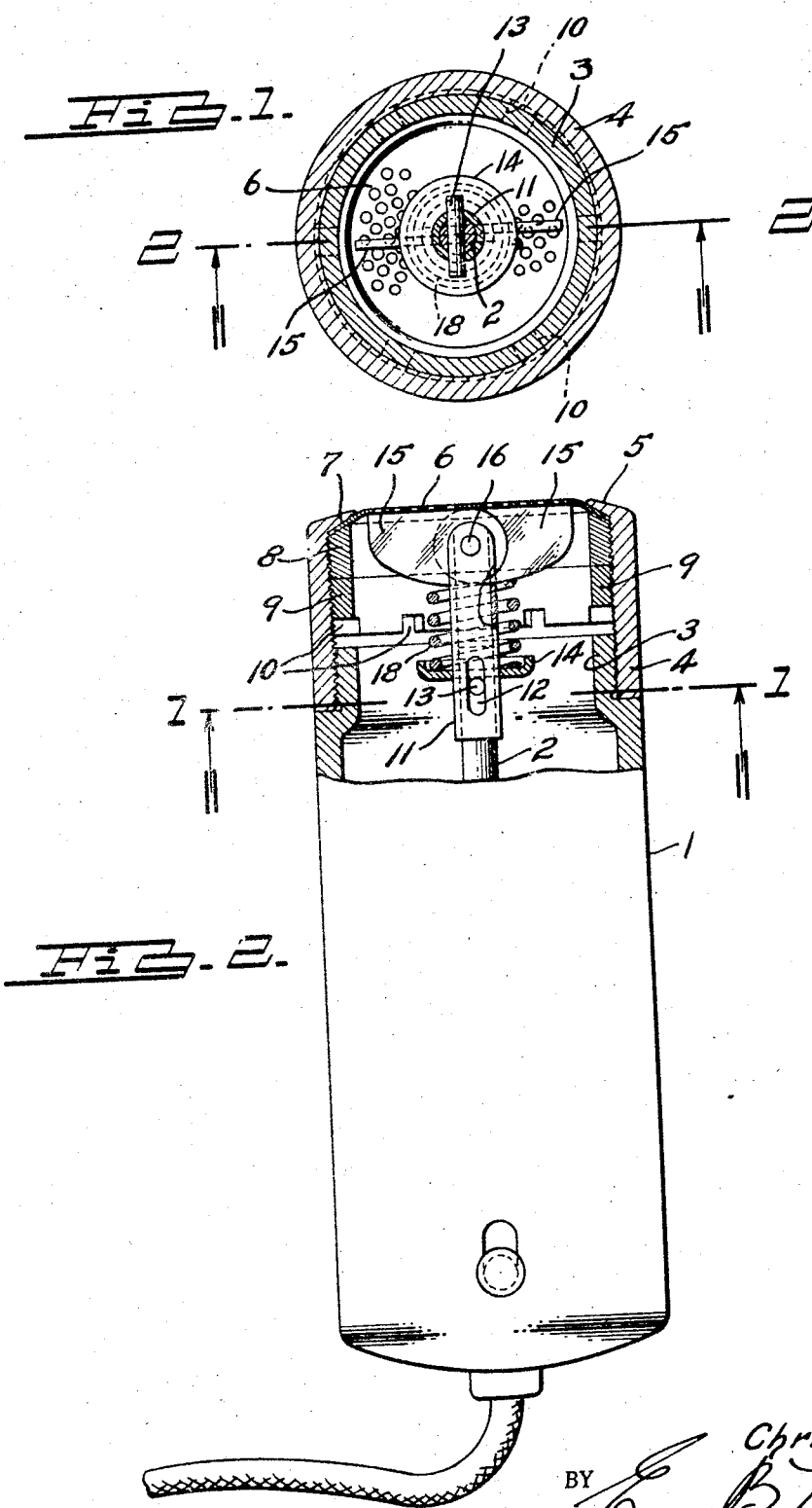
INVENTOR.
Chris L. Volz
BY
ATTORNEY.

Patented June 10, 1941

2,245,420

UNITED STATES PATENT OFFICE 2,245,420

CUTTER HEAD FOR ELECTRIC RAZORS

Chris L. Volz, Birmingham, Mich.

Application March 20, 1939, Serial No. 262,882

4 Claims. (Cl. 30—43)

This invention relates to cutter heads for electric razors and the object of the invention is to provide a cutter head that will cut the beard practically as close as a safety razor without irritating the skin.

One of the particular objects of the invention is to provide a densely perforated shear plate of such an extreme thinness that it is impossible to support the perforated shear plate against flexing during the shaving operation.

Another object of the invention is to provide an electric razor utilizing an extremely thin shear plate which is supported by the cutter blade rotating therebeneath so that the shear plate will conform to the contour and pressure of the movable cutter even when pressing the thin shear plate against the surface of the skin being shaved. By means of such flexibility of the shear plate which will tend to flex when pressed against the face, the cutter blade itself will support the shear plate and hold it tightly against the face by urging the cutter blade firmly against the shear plate whereby the beard is shaved very closely.

Another object of the invention is to provide a two bladed cutter pivotally mounted on the end of the drive shaft and provided with a spring for turning the cutters on the pivot and to urge the same into engagement with the shear plate.

These objects and the several novel features of the invention are hereinafter more fully described and claimed and the preferred form of construction by which these objects are attained is shown in the accompanying drawing in which—

Fig. 1 is a section through an electric razor embodying my invention taken on line 1—1 of Fig. 2.

Fig. 2 is a section through the cutter head taken on line 2—2 of Fig. 1.

The device comprises a housing 1 shown more particularly in Fig. 2 and arranged to contain a small electric motor (not here shown) for rotating the cutter shaft 2. The upper end 3 of the housing 1 is reduced in size and is threaded on the exterior to receive the cap 4 which may be threaded thereon. This cap 4 at the upper end is provided with an inturned flange 5 and a shear plate 6 is inserted into the cap 4 with the beveled edge portion 7 thereof fitting against the inner face of the inturned flange 5. In order to hold this shear plate in place, a ring 8 is threaded into the interior of the cap and engages tightly against the flange 7 of the shear plate to bindingly engage this flange 7 between the ring 8 and the flange 5. In order to lock this clamp ring 8 in place, a locking ring 9 is threaded into the cap into engagement with the ring 8 and this ring 9 is provided with spanner wrench notches 10 by means of which the ring may be turned up tightly.

Fitting over the upper end of the shaft 2 is a tube 11 and this tube is provided with slots 12 on the opposite sides and a pin 13 is secured in the shaft 2 and extends through the slots 12 so that the ends of the pin 13 extend beyond the outer circumference of the tube 11 as shown in Fig. 1. A cup washer 14 is fitted over the tube 11 and rests on the ends of the pin 13. A pair of cutter blades 15 are pivotally mounted on the pin 16 in the upper end of the tube 11 as shown in Figs. 1 and 2 and these cutter blades at the upper edge engage against the underside of the thin shear plate 6. In order to hold these cutter blades in contact with the underside of the shear plate and to support the shear plate, a coiled spring 18 is positioned on the cup washer 14 and engages the cutter blades 15 tending to urge the cutter assembly upwardly from the pin 13 and washer 14 as a foundation as will be understood from Fig. 2.

It will also be noted that by the bearing of the coiled spring 18 on the cutter blades 15 that these cutter blades are urged upwardly on the common pivot 16 to insure firm contact between the upper edges of the cutter blades and the lower surface of the shear plate. In the development work in connection with this razor, it was found that a shear plate as thin as one thousandth of an inch in thickness operated very effectively. A shear plate of this thinness normally tends to flex when placed in contact with the face to conform to the curvatures or portion of the face which it contacts. At the same time, the shear plate is supported from underneath by the cutter blades which are rapidly rotating and which to a certain extent allow the shear plate to follow the face conformation even while the cutter blades are rotating and therefore will shave the face very closely. By providing a multiplicity of apertures in the shear plate, the action of the cutter blades against these apertures will shear the beard as closely as the thickness of the shear plate which in the case of a shear plate having a thickness of one thousandth of an inch will shave the beard that close. Due to the thinness of the shear plate, it is desirous to be able to replace this shear plate from time to time when worn and this can be done by removing the threaded rings 8 and 9 to allow replacement of the shear plate. As the cutter blades are working against a flat surface, they will constantly tend to keep themselves sharpened by the wear of the upper edges of the cutter blades against the inner face of the shear plate which keeps these cutter blades in a sharp condition.

I have also found that a single blade may be mounted on the upper end of the tube 11 and will operate quite effectively particularly when pivoted on the pivot 16 to allow the blade to tilt slightly when pressure is applied to the outside of the shear plate by the face.

From the foregoing description it becomes evident that the device is very simple and efficient in operation, will not easily get out of order, may be easily and quickly assembled or dis-assembled and provides a device which accomplishes the objects described.

Having thus fully described my invention, its utility and mode of operation, what I claim and desire to secure by Letters Patent of the United States is—

1. A cutter head for an electric razor comprising a housing, a perforated thin flexible metal shear plate mounted in the end of the housing, a shaft rotatably mounted in the housing, means for rotating the shaft, a sleeve slidably mounted on the end of the shaft and movable longitudinally thereof to a limited extent, a pair of cutters each pivotally mounted in the upper end of the sleeve to independently turn on a common axis in a plane parallel with the axis of the sleeve, a spring urging the sleeve upwardly, said spring also engaging the cutters and tending to turn the same upwardly on their common pivot, the arrangement being such that upward movement of the sleeve moves the blades into contact with the central portion of the thin metal shear plate and turning movement of the cutters upwardly on their common pivot maintains the outer ends of the cutters in contact with the outer portion of the metal shear plate under less pressure than at the central portion.

2. A cutter head for an electric razor comprising a housing, a shaft rotatably mounted in the housing and extending longitudinally thereof, a thin flexible metal shear plate in the end of the housing extending transversely to the axis of the shaft, a sleeve movable longitudinally of the shaft to a limited extent, a pair of cutter blades pivotally mounted in the end of the sleeve to independently turn on a common axis and movable by the sleeve into contact with the inner face of the shear plate, a coiled spring positioned about the sleeve and engaging the cutter blades adjacent their common axis at one end and supported on the shaft at the opposite end, said coiled spring urging the sleeve longitudinally of the housing to press the cutter blades into contact with the inner face of the shear plate, said spring also tending to turn the cutter blades on their axis to maintain the outer ends of the cutter blades in contact with the inner face of the shear plate during rotation of the cutter head under less pressure than the pressure at the center.

3. A cutter head for an electric razor comprising a sleeve, a pair of cutter blades pivotally mounted to independently turn on a common axis in the outer end of the sleeve, the cutting edge of the cutters extending beyond the end of the sleeve and terminating in a half circular end whose center is on the common axis, an electric razor housing, a thin perforated flexible metal shear plate mounted in the end of the housing, a shaft rotatably mounted in the housing and extending at a right angle to the plane of the shear plate, the sleeve being mounted over the end of the shaft and turnable therewith, means limting movement of the sleeve longitudinally of the shaft, a spring urging the cutter blades upwardly on their common pivot, said spring also urging the sleeve longitudinally of the shaft and being arranged to maintain the pivoted cutter blades with the cutting edges in contact with the inner face of the shear plate under the greatest pressure at the center of the plate.

4. A cutter head for an electric razor comprising a housing, a thin flexible metal shear plate mounted in the end of the housing, a shaft rotatably mounted in the housing, means for rotating the shaft, a pair of cutters piovtally connected to the upper end of the shaft to independently turn on a common axis and yieldable means tending to turn the cutters upwardly on their pivot by pressure applied to the cutters adjacent the pivot point and maintain the same in continuous contact with the inner face of the shear plate under decreasing pressure from the center of the shear plate outwardly.

CHRIS L. VOLZ.